(12) United States Patent
Carter

(10) Patent No.: US 11,770,099 B2
(45) Date of Patent: Sep. 26, 2023

(54) SYSTEMS AND METHODS FOR AUTOMATED INSTALLATION OF PHOTOVOLTAIC MODULES AND SOLAR PLANTS

(71) Applicant: Nicholas Paul Carter, San Carlos, CA (US)

(72) Inventor: Nicholas Paul Carter, San Carlos, CA (US)

(*) Notice: Subject to any disclaimer, the term of this patent is extended or adjusted under 35 U.S.C. 154(b) by 50 days.

(21) Appl. No.: 17/316,968

(22) Filed: May 11, 2021

(65) Prior Publication Data

US 2022/0103122 A1 Mar. 31, 2022

Related U.S. Application Data

(60) Provisional application No. 63/083,121, filed on Sep. 25, 2020.

(51) Int. Cl.
*H02S 99/00* (2014.01)
*B65G 67/04* (2006.01)

(52) U.S. Cl.
CPC .............. *H02S 99/00* (2013.01); *B65G 67/04* (2013.01)

(58) Field of Classification Search
CPC ............ B62B 2203/30; E04H 21/1822; E04H 21/1827; E04H 21/1838; E04H 21/1872; E04H 21/20; B60P 1/483; H02S 99/00
See application file for complete search history.

(56) References Cited

U.S. PATENT DOCUMENTS

| | | | |
|---|---|---|---|
| 4,026,519 A * | 5/1977 | Piercy | E04F 21/1822 254/2 R |
| 4,498,822 A | 2/1985 | Diba | |
| 6,105,242 A | 8/2000 | Miyasaka et al. | |
| 6,179,549 B1 | 1/2001 | Hayakawa | |

(Continued)

FOREIGN PATENT DOCUMENTS

| | | | |
|---|---|---|---|
| DE | 3238187 A1 | 4/1984 | |
| DE | 202020104473 U1 * | 10/2020 | B25J 15/0014 |

OTHER PUBLICATIONS

Machine translation of DE-202020104473-U1 from espacenet. (Year: 2020).*

*Primary Examiner* — Mark C Hageman
(74) *Attorney, Agent, or Firm* — Eric L. Lane; Green Patent Law

(57) ABSTRACT

Photovoltaic module feeder assemblies, systems and methods are provided which comprise two rotatable arms, a grabber bar, and at least two gripping pieces. Each arm has a proximal end and a distal end and a plurality of articulation points. The grabber bar is coupled to the distal end of each rotatable arm, and the gripping pieces are connected to each grabber bar. When the rotatable arms rotate to position the grabber bars in alignment with a photovoltaic module, the gripping pieces activate and grip or support the photovoltaic module. The rotatable arms maintain the short sides of the photovoltaic module in a horizontal position by utilizing one or more of the plurality of articulation points. The photovoltaic module feeder assembly may be coupled to a mobile unit having a conveyor and guide rails for moving and holding a pallet of photovoltaic modules. Disclosed methods may be controlled by software that can determine a just-in-time installation schedule.

14 Claims, 15 Drawing Sheets

(56) References Cited

U.S. PATENT DOCUMENTS

| | | | |
|---|---|---|---|
| 7,311,488 B2* | 12/2007 | Park | H01L 21/67736 |
| | | | 414/663 |
| 8,151,453 B2 | 4/2012 | Garcia Tercero | |
| 8,225,496 B2 | 7/2012 | Bachrach et al. | |
| 8,635,773 B2 | 1/2014 | Carter | |
| 8,851,560 B1 | 10/2014 | Freeman | |
| 9,519,882 B2* | 12/2016 | Galluzzo | G05D 1/0088 |
| 9,733,646 B1* | 8/2017 | Nusser | B65G 1/137 |
| 10,756,667 B2 | 8/2020 | Iversen | |
| 10,801,755 B1 | 10/2020 | Nemat et al. | |
| 10,894,664 B1* | 1/2021 | Brady | B65G 1/1378 |
| 11,241,799 B2* | 2/2022 | Clemenzi | H02S 20/10 |
| 11,267,653 B2* | 3/2022 | Helsel | G05D 1/0297 |
| 2009/0077804 A1 | 3/2009 | Bachrach et al. | |
| 2009/0211071 A1 | 8/2009 | Lu et al. | |
| 2009/0287446 A1 | 11/2009 | Wang et al. | |
| 2010/0037932 A1 | 2/2010 | Erez et al. | |
| 2012/0163937 A1 | 6/2012 | Zemaitatis | |
| 2013/0133172 A1* | 5/2013 | Kiener | B60P 3/14 |
| | | | 414/539 |
| 2016/0214798 A1 | 7/2016 | McCall et al. | |
| 2019/0291956 A1* | 9/2019 | Pajevic | B66F 9/063 |
| 2021/0379757 A1* | 12/2021 | Schneider | B25J 13/08 |

* cited by examiner

PV Plant specification

Size of plant (W): 497250  
Module power (W): 425   Number of modules: 1170  
Module short side (inches): 40   Module long side (inches): 79  
Module orientation:  ● Portrait   ○ Landscape  
Number of module rows on one rack: 2  
Number of modules per inverter: 96  
Tilt angle (degrees): 30  
Linear space required (feet): 1950  
Row length (feet): 390   Number of rows: 5  
Number of modules per pallet: 26  
Number of pallets: 45  
Module delivery interval to complete plant in 8 hours: 24 seconds  
Pallet delivery interval: 624 seconds  
Staging area: 20 feet x 12 feet  
Maximum distance for Cart 840 feet  
Maximum speed for Cart 0 mph

[OK]  [Cancel]

Plant dimensions: 390 feet wide x 147 feet deep  
Row footprint = 136 inches, Space between rows = 271 inches  
Array height = 78 inches  
Ground coverage ratio = 0.37  
Distance travelled by excavator = 2297 feet (0.44 miles)  
Distance travelled by cart = 25950 feet (4.91 miles)

Cross-section of array:  
6'6"  22'7"  11' 4"

Plan view of array:

Dashed line = angle of sun @ 9am, 21st December  
Solar window angle vs S = 42 degrees  
Solar elevation angle = 12 degrees

FIG. 16

SYSTEMS AND METHODS FOR AUTOMATED INSTALLATION OF PHOTOVOLTAIC MODULES AND SOLAR PLANTS

CROSS-REFERENCE TO RELATED APPLICATION

This application is a non-provisional of and claims priority to U.S. Patent Application Ser. No. 63/083,121, filed Sep. 25, 2020, which is hereby incorporated by reference in its entirety.

FIELD

The present disclosure relates to the field of solar power generation and to the installation of solar photovoltaic (PV) modules.

BACKGROUND

Photovoltaic (PV) systems consisting of numerous PV modules are being installed in growing numbers. Also growing rapidly is the number of modules used in such installations, up to hundreds of thousands or millions of modules in some cases.

Therefore, there exists a need for improved assemblies, systems, and methods for installing PV modules at large scale. There is a need for a system and method to automate the module installation process. There also is a need for assemblies, systems, and methods that make PV module installation more efficient.

SUMMARY

The present disclosure, in its many embodiments, alleviates to a great extent the disadvantages of known photovoltaic module installation systems and methods. Embodiments of the disclosure automate the installation of PV modules, thus facilitating the module installation process, which is especially significant for larger scale PV power plants.

The present disclosure describes an automated feed mechanism mounted on an autonomous cart that can work in conjunction with a conveyor mechanism such as the one described and claimed in U.S. Pat. No. 8,635,773, issued Jan. 28, 2014, which is hereby incorporated by reference in its entirety, An exemplary mechanism lifts individual photovoltaic modules from a palletized stack and delivers each one in turn to the tilted conveyor mechanism. An exemplary mechanism comprises two independent arms, each with multiple articulation points and a grabber piece at the end with two grippers.

Exemplary embodiments of a photovoltaic module feeder assembly comprise two rotatable arms, a grabber bar, and at least two gripping pieces. Each arm has a proximal end and a distal end and a plurality of articulation points. A grabber bar is coupled to the distal end of each rotatable arm, and at least two gripping pieces are connected to each grabber bar. When the rotatable arms rotate to position the grabber bars in alignment with a photovoltaic module, the gripping pieces activate and grip or support the photovoltaic module. In exemplary embodiments, the rotatable arms move the photovoltaic module over the ground and maintain the short sides of the photovoltaic module in a horizontal position relative to the ground. The rotatable arms maintain the short sides of the photovoltaic module in a horizontal position by utilizing one or more of the articulation points.

A mobile unit may also be provided. The mobile unit has a left side, a right side, an upper surface, a front end, and a back end, and the photovoltaic module feeder assembly is coupled to the front end or the back end of the mobile unit. The mobile unit may further comprise a conveyor such as a roller conveyor mounted on its upper surface. In exemplary embodiments, the mobile unit has a pair of guide rails on the upper surface, e.g., a first guide rail located on the left side and a second guide rail located on the right side. The mobile unit may also have a stop rail positioned near the front end of the mobile unit.

An exemplary embodiment of a photovoltaic module feeder system comprises a mobile unit and a feeder assembly. The mobile unit has a left side, a right side, an upper surface, a front end, and a back end. The mobile unit may further comprise a conveyor such as a roller conveyor mounted on the upper surface. In exemplary embodiments, the mobile unit has guide rails on the upper surface with a first guide rail located on the left side, a second guide rail located on the right side, and a stop rail positioned at or near the front end.

The photovoltaic module feeder assembly is coupled to the front end of the mobile unit. The feeder assembly comprises two rotatable arms, grabber bars, and gripping pieces. Each arm has a proximal end and a distal end and a plurality of articulation points. The grabber bar is coupled to the distal end of each rotatable arm, and at least two gripping pieces are connected to each grabber bar. When the rotatable arms rotate to position the grabber bars in alignment with a photovoltaic module, the gripping pieces activate and grip the photovoltaic module. In exemplary embodiments, the rotatable arms move the photovoltaic module over the ground and maintain the short sides of the photovoltaic module in a horizontal position relative to the ground. The rotatable arms maintain the short sides of the photovoltaic module in a horizontal position by utilizing one or more of the articulation points.

Exemplary methods of installing photovoltaic modules comprise loading a first pallet of photovoltaic modules onto a first mobile unit. The mobile unit has a photovoltaic module feeder assembly coupled to it. Exemplary methods include the subsequent steps of rotating a pair of arms to position grabber bars and gripping pieces in alignment with a first photovoltaic module at the top of the pallet, gripping or supporting the first photovoltaic module, rotating the pair of arms toward a delivery surface, and releasing the first photovoltaic module onto the delivery surface. The pair of arms is then rotated to position the grabber bars and gripping pieces in alignment with a subsequent photovoltaic module on the pallet, and the subsequent photovoltaic module is gripped or supported. The method steps include next rotating the pair of arms toward the delivery surface and releasing the subsequent photovoltaic module onto the delivery surface.

When the rotatable arms move the first and subsequent photovoltaic module over the ground, the rotatable arms maintain the short sides of the first and subsequent photovoltaic module in a horizontal position relative to the ground. When the rotatable arms move the first and subsequent photovoltaic module over the delivery surface, the rotatable arms maintain the first and subsequent photovoltaic module in a position parallel to the delivery surface. Disclosed methods further comprise repeating the rotating, gripping, and releasing steps until all the photovoltaic modules in the first pallet have been released onto the delivery surface and the first pallet is empty. Then the empty pallet may be removed from the first mobile unit and a second pallet of photovoltaic modules loaded onto a second mobile unit. The second pallet may be transported by the second mobile unit to the first mobile unit and loaded onto the first mobile unit.

In exemplary methods the short sides of each photovoltaic module are maintained in a horizontal position relative to the ground during the rotating, gripping, and releasing steps. The delivery surface may be a tilted conveyor for installation of the solar modules, and the mobile units may also have a conveyor and a pair of guide rails on their upper surface. Exemplary methods are controlled by computer-implemented software which utilizes a plurality of inputs to determine a just-in-time module installation and pallet delivery schedule.

Accordingly, it is seen that assemblies, systems, and methods of installing photovoltaic modules are provided. These and other features of the present invention will be appreciated from review of the following detailed description of the invention, along with the accompanying figures in which like reference numbers refer to like parts throughout.

BRIEF DESCRIPTION OF THE DRAWINGS

The foregoing and other objects of the disclosure will be apparent upon consideration of the following detailed description, taken in conjunction with the accompanying drawings, in which:

FIG. 16 is an output view of an exemplary embodiment of computer-implemented software showing a sample PV plant in accordance with the present disclosure, the delivery locations of the pallets of modules and the cross-section of the array with dimensions to avoid shading.

DETAILED DESCRIPTION

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure. As used herein, the "present disclosure" refers to any one of the embodiments described herein, and any equivalents.

Furthermore, reference to various aspects of the disclosure throughout this document does not mean that all claimed embodiments or methods must include the referenced aspects. Reference to shape, orientation, and other parameters should be considered as representative and illustrative of the capabilities of exemplary embodiments, and embodiments can operate with a wide variety of such parameters. It should be noted that the figures do not show every piece of equipment.

Figure 1:
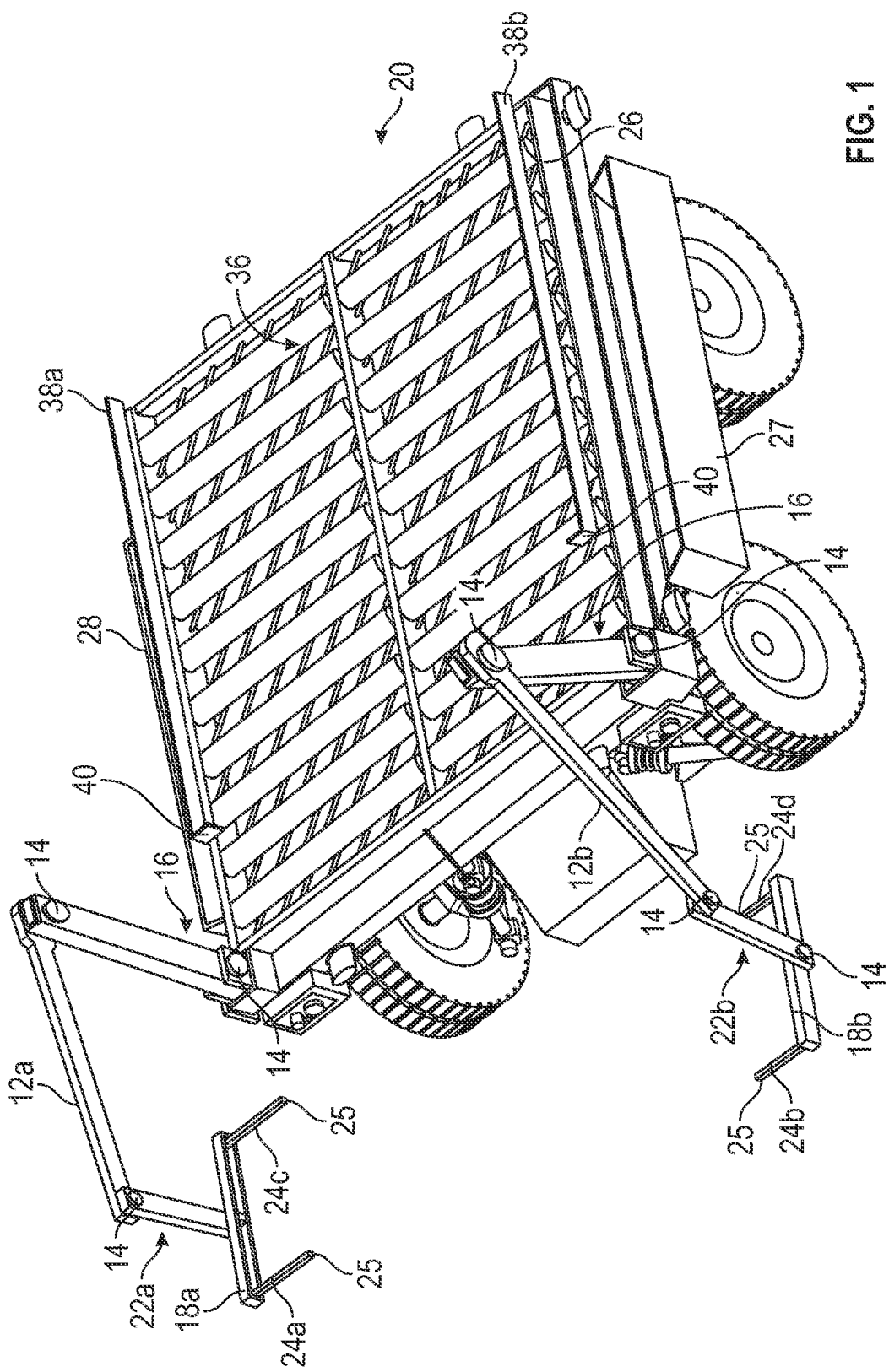
FIG. 1 is a perspective view of an exemplary embodiment of a photovoltaic module feeder assembly and mobile unit in accordance with the present disclosure.
Figure 2:
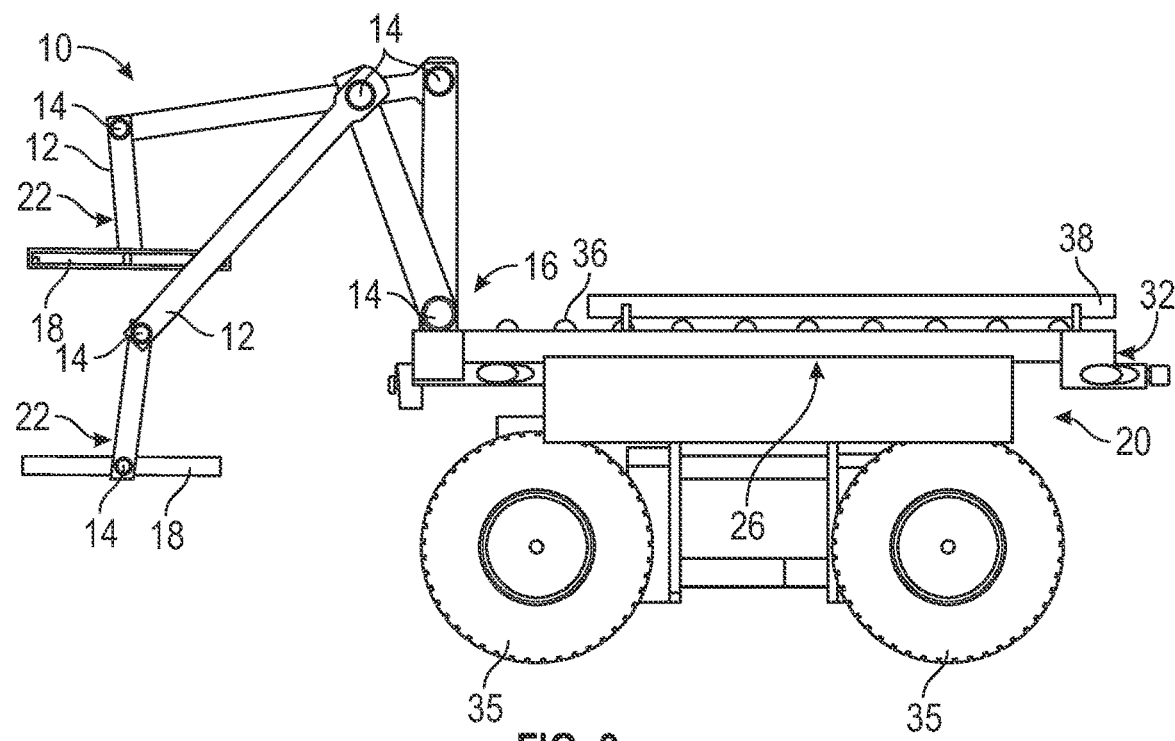
FIG. 2 is a side view of an exemplary embodiment of a photovoltaic module feeder assembly and mobile unit in accordance with the present disclosure.
Figure 3:
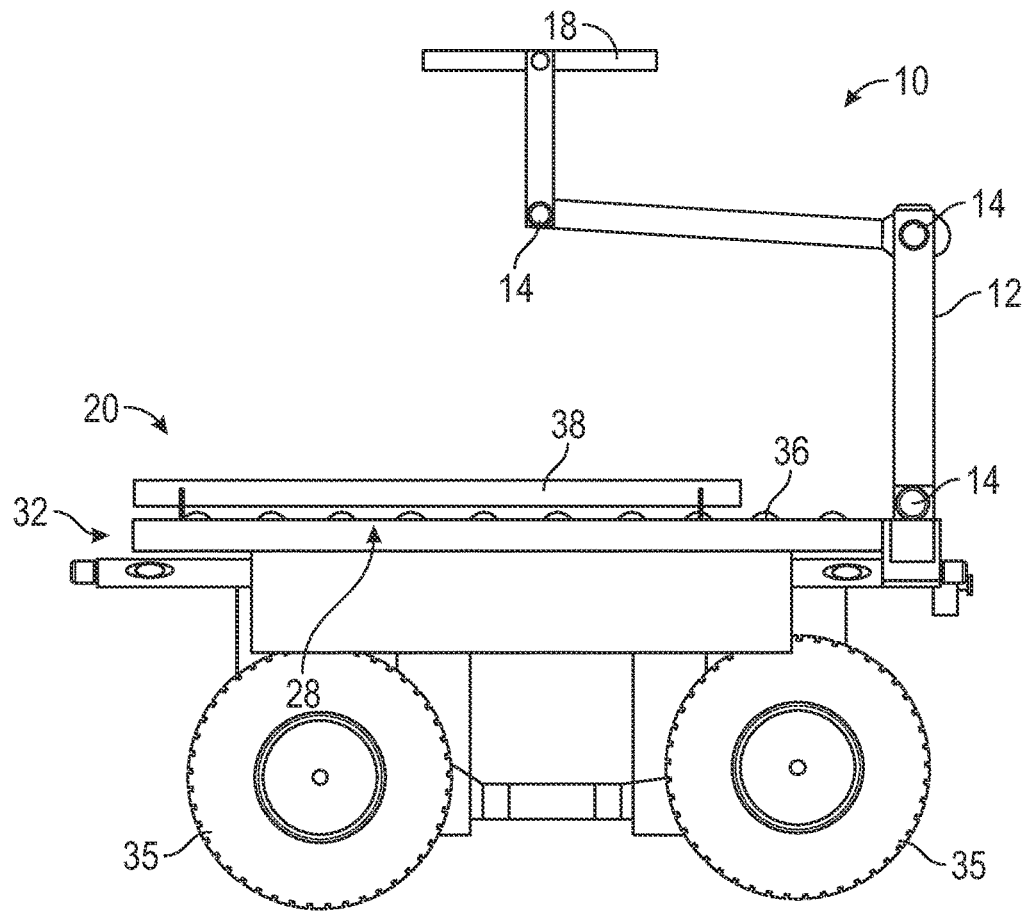
FIG. 3 is a side view of an exemplary embodiment of a photovoltaic module feeder assembly and mobile unit in accordance with the present disclosure.

Referring to FIGS. 1-3, an exemplary photovoltaic module feeder assembly 10 will be described. The feeder assembly 10 has at least one rotatable arm 12 and, in exemplary embodiments has two arms, i.e., first rotatable arm 12a and second rotatable arm 12b. Each arm 12 has a plurality of articulation points 14 which provide great flexibility of movement and allow the arm to rotate as necessary. The proximal end 16 of each arm 12 is configured to be attached to an apparatus that can hold photovoltaic modules. As discussed herein, the rotatable arms 12a, 12b may be part of a specially designed mobile unit 20. In exemplary embodiments, a grabber bar 18 is coupled to the distal end 22 of each rotatable arm 12. More particularly, first grabber bar 18a is coupled to the distal end 22a of first arm 12a, and second grabber bar 18b coupled to the distal end 22b of second arm 12b.

As best seen in FIG. 1, exemplary embodiments utilize a pair of gripping pieces 24 connected to each grabber bar 18. The gripping pieces 24 could be moveable and rotatable mechanically, electro-mechanically, or by any other suitable technology. In exemplary embodiments, a first pair of gripping pieces 24a, 24c is coupled to first grabber bar 18a, and a second pair of gripping pieces 24b, 24d coupled to second grabber bar 18b. Any number of gripping pieces 24 could be used depending on the application. Each pair of gripping pieces 24a, 24c and 24b, 24d is connected to its respective grabber bars 18a, 18b such that their gripping ends 25 extend perpendicularly inward from the grabber bars toward the oppositely located grabber bar 18 and gripping piece 24. That is, gripping ends 25 of gripping pieces 24a, 24c coupled to grabber bar 18a extend toward the gripping ends 25 of gripping pieces 24b, 24d of grabber bar 18b. As discussed in more detail herein, this configuration advantageously facilitates pick-up, movement, transfer, and release of photovoltaic modules. The above-described components are designed and configured so that when the rotatable arms 12a, 12b rotate to position the grabber bars 18a, 18b in alignment with a photovoltaic module, the gripping pieces 24a, 24c and 24b, 24d activate and grip or support the photovoltaic module.

Exemplary photovoltaic module feeder assemblies 10 could be used with any suitable stationary or mobile apparatus that holds, carries and/or moves photovoltaic modules. Turning to FIGS. 4-8, in exemplary embodiments, feeder assembly 10 is coupled to mobile unit 20. Though it could be any suitable shape or design, an exemplary mobile unit 20 is substantially square or rectangular. Thus, the mobile unit 20 has a left side 26, a right side 28, a front end 30, a back end 32, and an upper surface 34. In exemplary embodiments, the photovoltaic module feeder assembly 10 is coupled to the front end 30 of the mobile unit 20, although other suitable attachment locations could be used as needed. The mobile unit 20 could have rotatable wheels 35, tracks or treads, and may have tires made of a suitable material as well as axles and other mechanical components known in the art. An onboard motor powered by batteries or other known means of being powered (e.g., internal combustion) is also provided.

Figure 4:
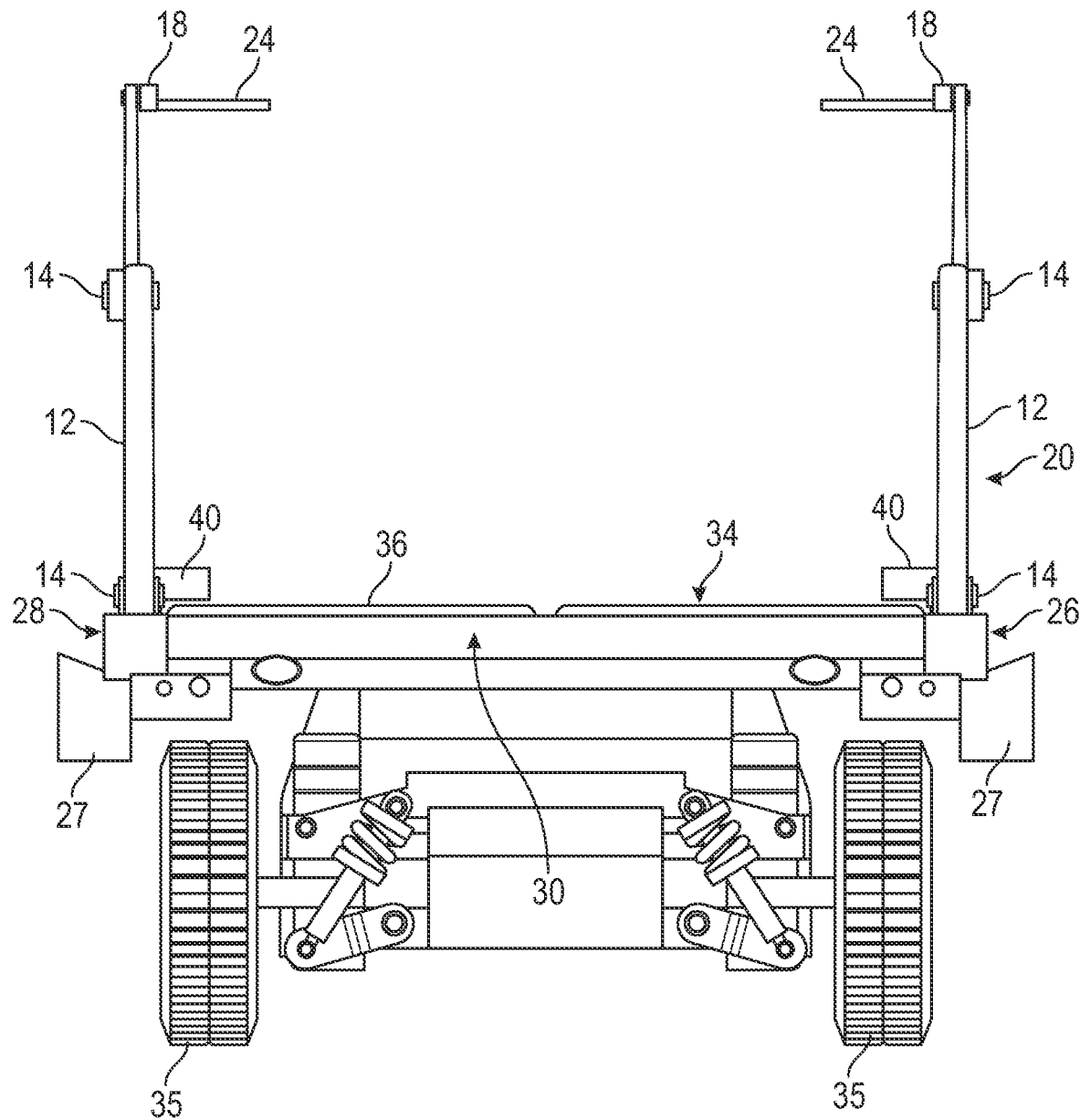
FIG. 4 is a front view of an exemplary embodiment of a photovoltaic module feeder assembly and mobile unit in accordance with the present disclosure.
Figure 5:
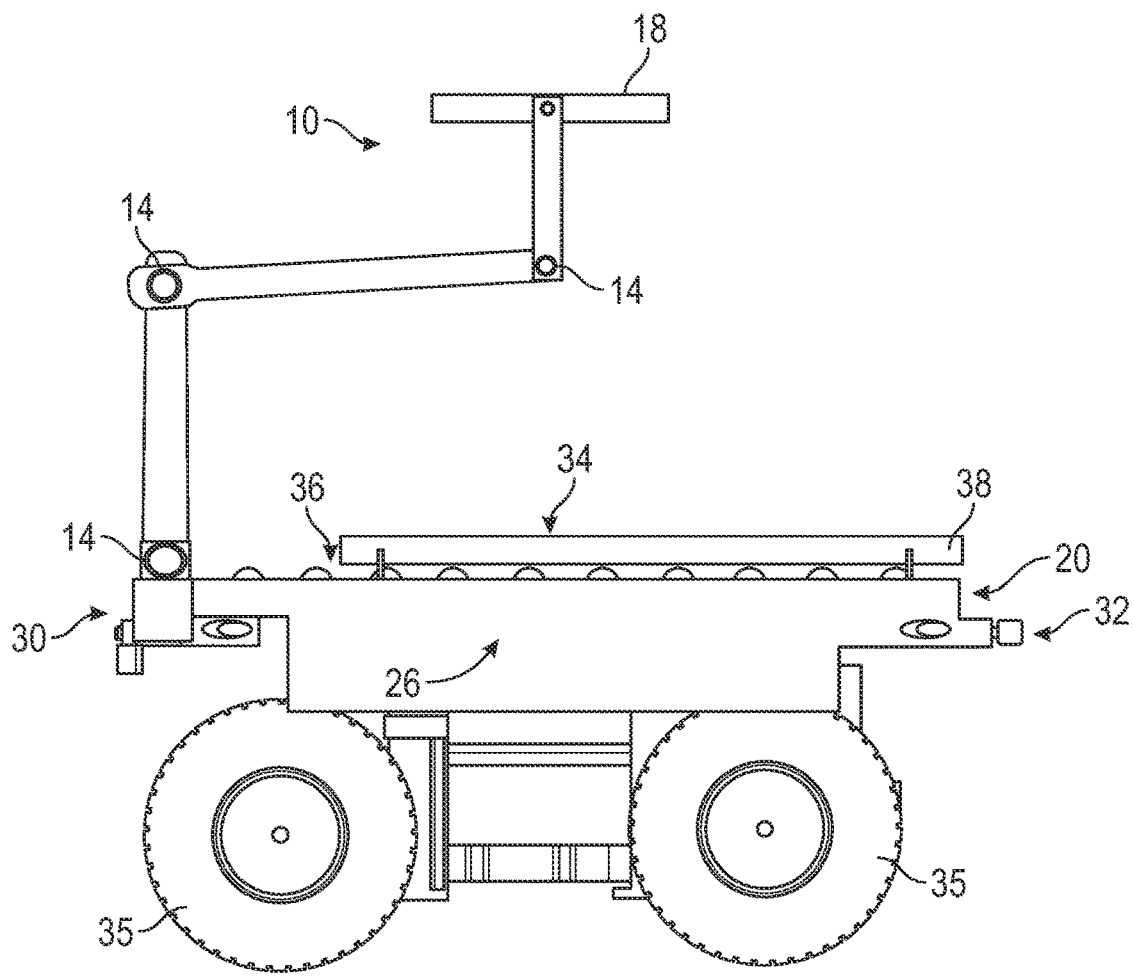
FIG. 5 is a side view of an exemplary embodiment of a photovoltaic module feeder assembly and mobile unit in accordance with the present disclosure.
Figure 6:
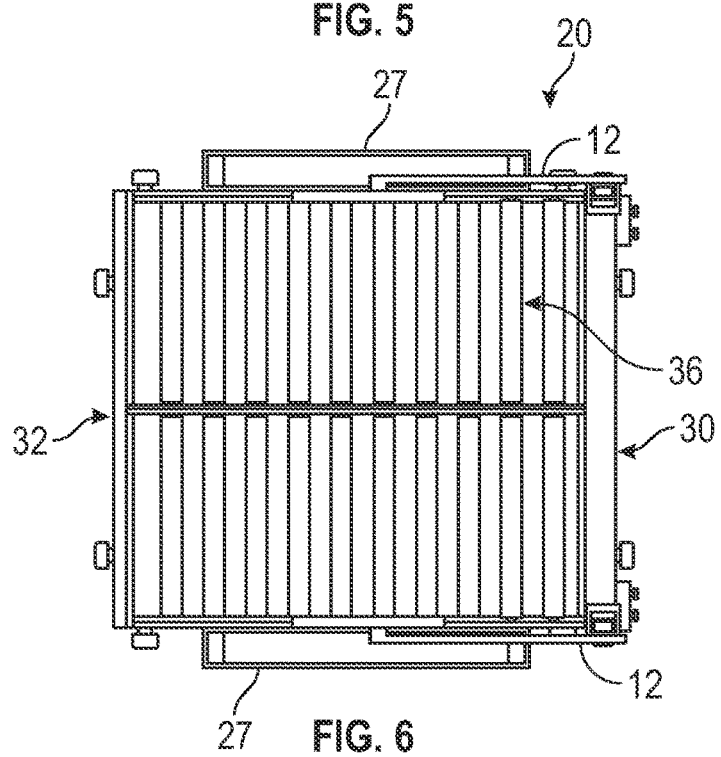
FIG. 6 is a top view of an exemplary embodiment of a mobile unit in accordance with the present disclosure.
Figure 7:
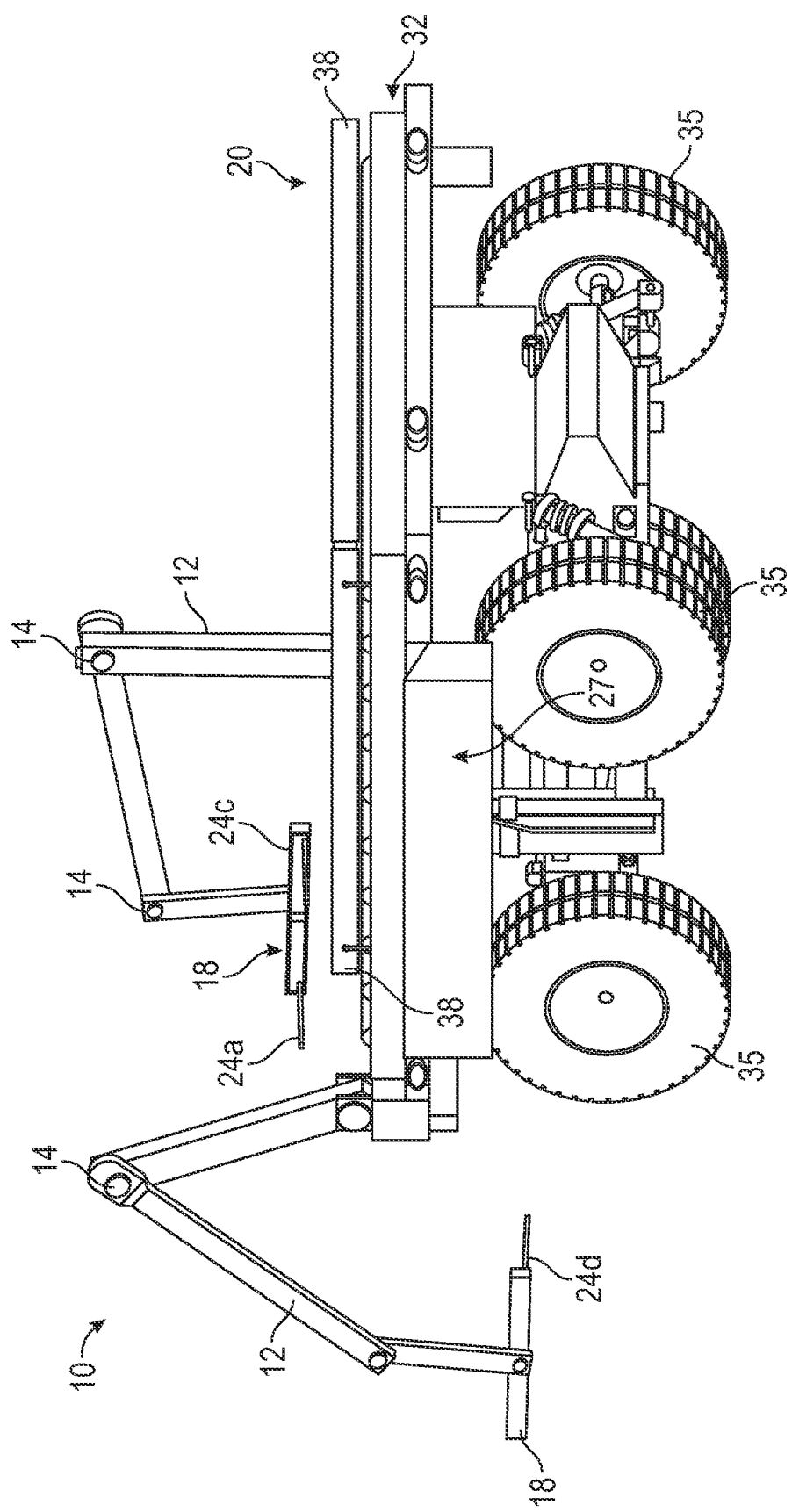
FIG. 7 is a perspective view of an exemplary embodiment of a photovoltaic module feeder assembly and a mobile unit showing the independence of the rotatable arms in accordance with the present disclosure.
Figure 8:
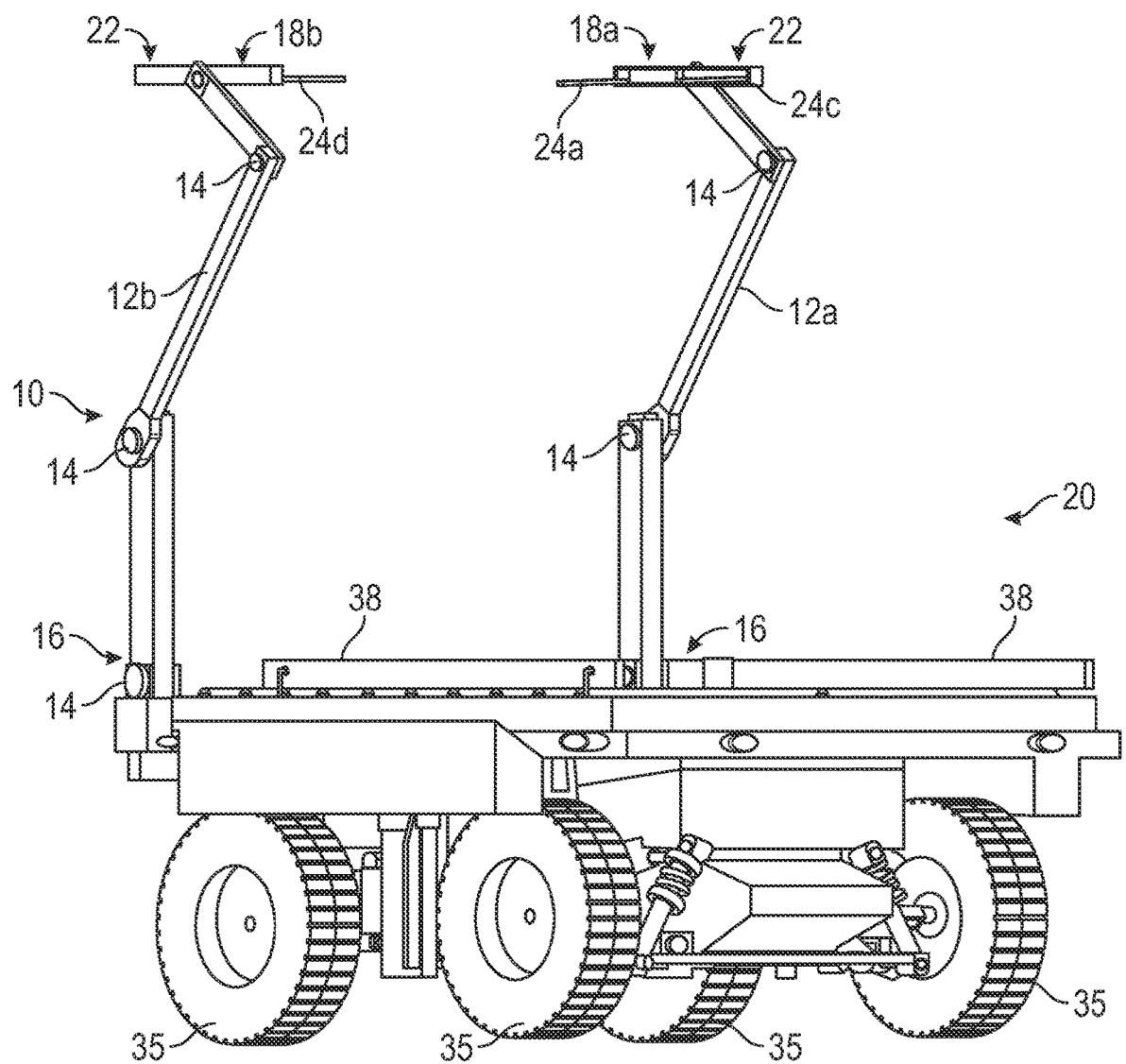
FIG. 8 is a perspective view of an exemplary embodiment of a photovoltaic module feeder assembly and mobile unit in accordance with the present disclosure.

An exemplary embodiment of a mobile unit 20 includes a conveyor 36 mounted on its upper surface 34. The mobile unit conveyor 36 could be of any type, including but not limited to, a belt conveyor or a roller conveyor. The upper surface 34 of the mobile unit 20 also may have guide rails 38 to maintain photovoltaic modules in position and prevent a pallet of modules from falling off the mobile unit. In exemplary embodiments, a first guide rail 38a is located on or near the right side 28 of the mobile unit 20, and a second guide rail 38b is located on or near the left side 26. As best seen in FIGS. 1 and 4, the bent ends of guide rails 38a and 38b form stop rails 40 positioned near the front end of the mobile unit. As discussed herein, the first and second guide rails 38a, 38b serve to guide a stack of photovoltaic modules until they hit the stop rail 40 close to the front end 30 of the mobile unit 20.

In exemplary embodiments, troughs 27 are mounted to the right 28 and left 26 sides of the mobile unit 20 just below the plane of the upper surface 34 to catch packaging spacers (not shown) that may be placed between the PV modules 44. As each individual PV module 44 is lifted from the top of the stack of modules on the pallet 42, packaging spacers positioned between the modules will be displaced. As these fall aside they may be captured in the trough 27.

Figure 9:
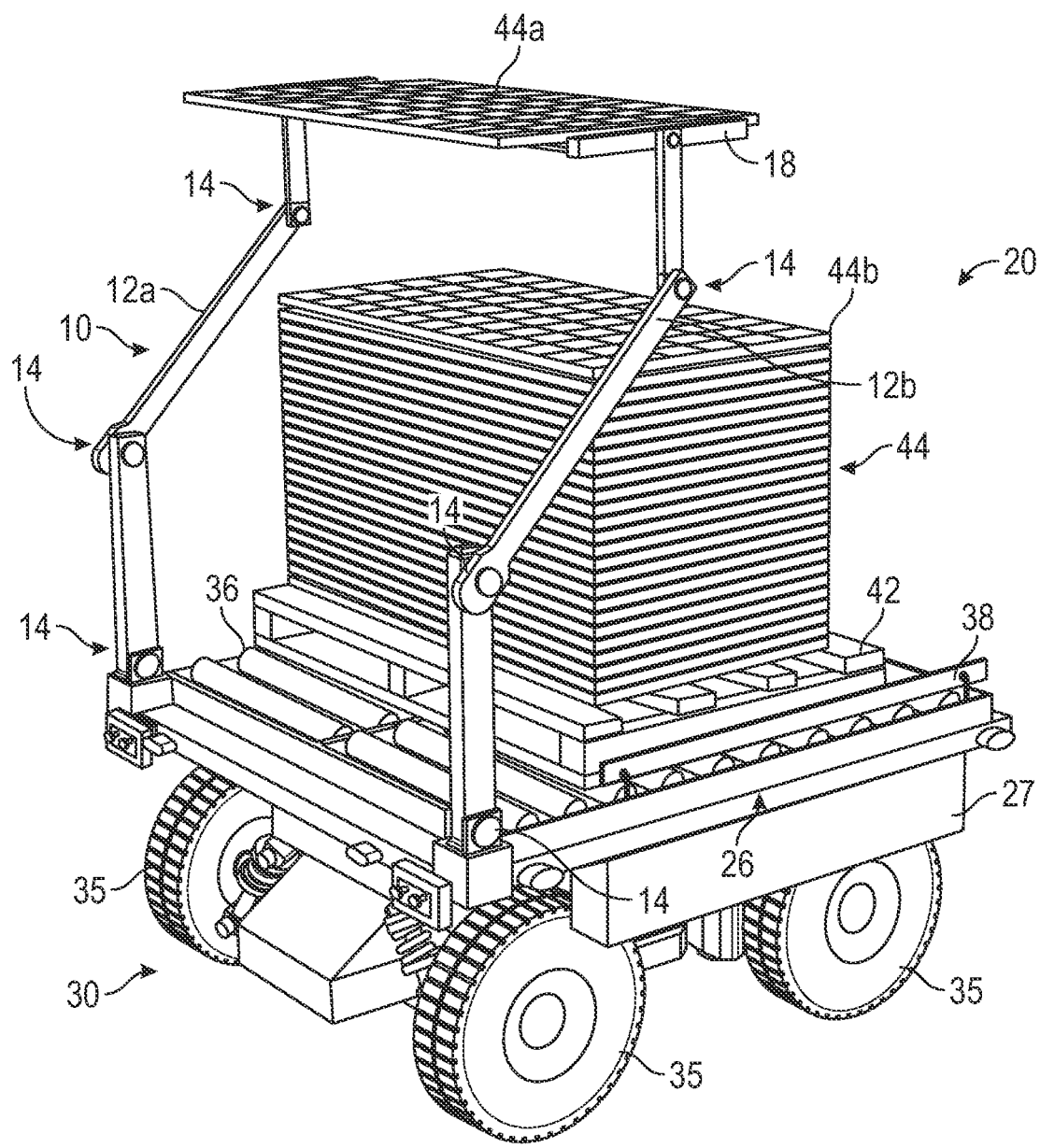
FIG. 9 is a perspective view of an exemplary embodiment of a photovoltaic module feeder assembly and a mobile unit with a pallet of photovoltaic modules in accordance with the present disclosure.
Figure 10:
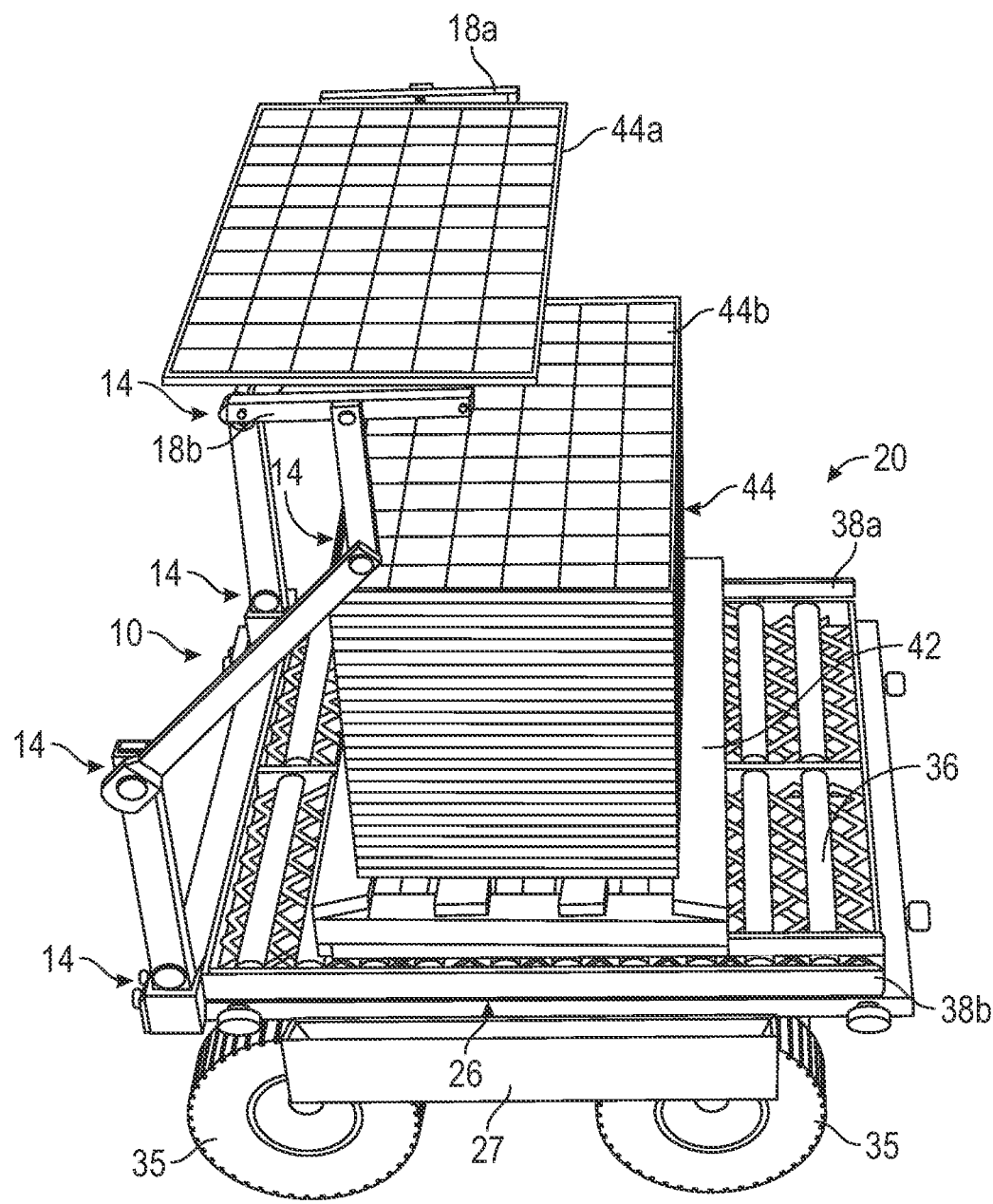
FIG. 10 is a perspective view of an exemplary embodiment of a photovoltaic module feeder assembly and a mobile unit with a pallet of photovoltaic modules in accordance with the present disclosure.
Figure 11:
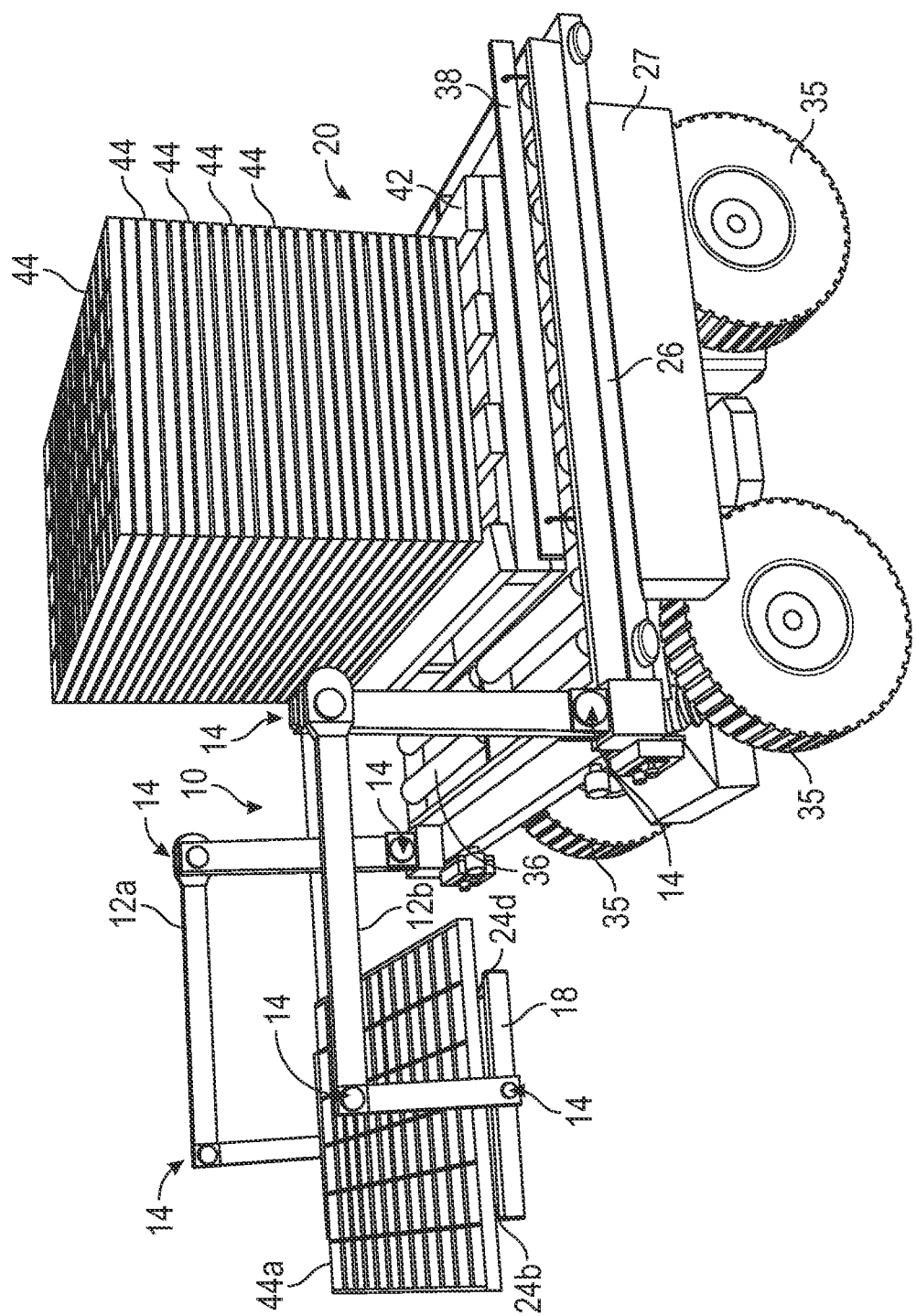
FIG. 11 is a perspective view of an exemplary embodiment of a photovoltaic module feeder assembly and a mobile unit with a pallet of photovoltaic modules in accordance with the present disclosure.
Figure 13:
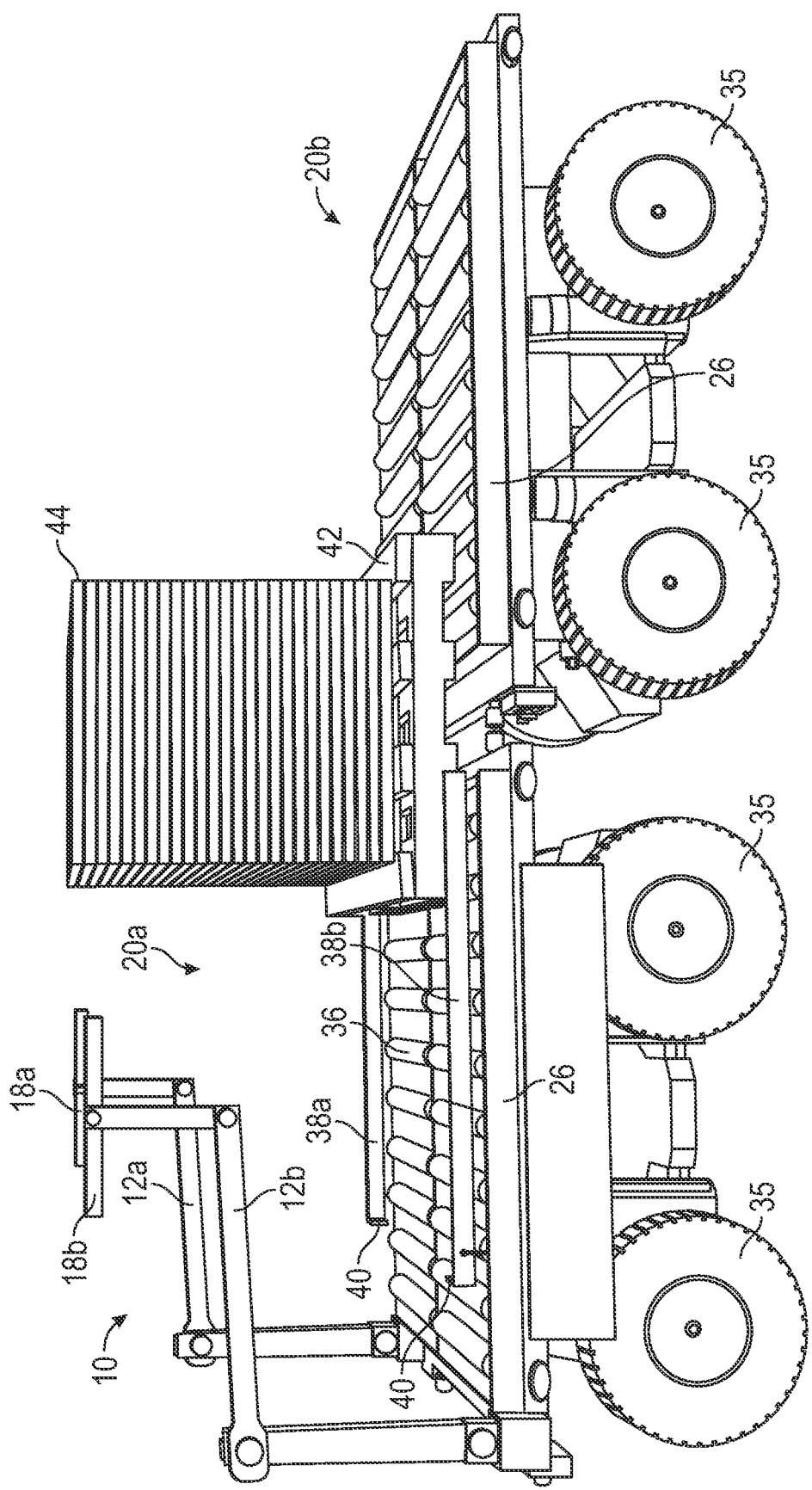
FIG. 13 is a side perspective view of an exemplary embodiment of a photovoltaic module installation and delivery method showing a second mobile unit delivering a pallet of photovoltaic modules to a first mobile unit in accordance with the present disclosure.
Figure 14:
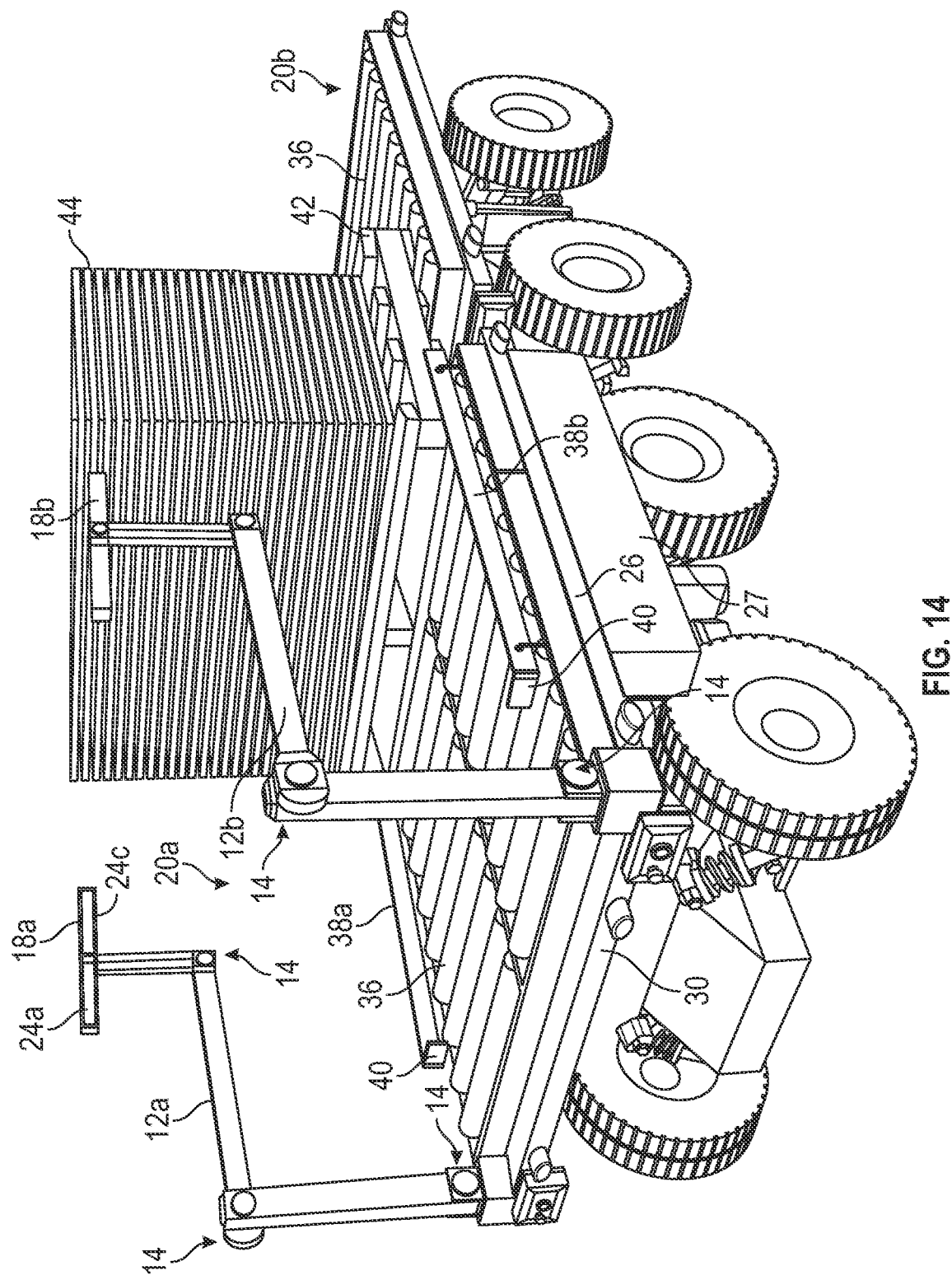
FIG. 14 is a front perspective view of an exemplary embodiment of a photovoltaic module installation and delivery method showing a second mobile unit delivering a pallet of photovoltaic modules to a first mobile unit in accordance with the present disclosure.

In operation, a first pallet 42 of photovoltaic modules 44 is loaded onto a first mobile unit 20a with a feeder assembly 10 coupled to it, as shown in FIGS. 13 and 14. This could be done by another mobile unit as describe herein, or by solar installation workers or any suitable mechanical system. As demonstrated in FIGS. 9-11, the rotatable arms 12a, 12b rotate until the grabber bars 18a, 18b and gripping pieces 24a, 24b are aligned with the first PV module 44a to be lifted, the module at the top of the pallet 42. The gripping pieces 24a, 24b then activate and rotate to grip or support the first PV module 44a. The arms 12a, 12b then rotate using their articulation points 14 as necessary, with the short sides 43 (FIG. 15) of the PV module 44a remaining horizontal as it is moved over the ground to a delivery surface. FIGS. 9-11 show a mobile unit 20 with the rotatable arms 12 of the feeder assembly 10 in the process of rotating to the module delivery position.

Figure 12:
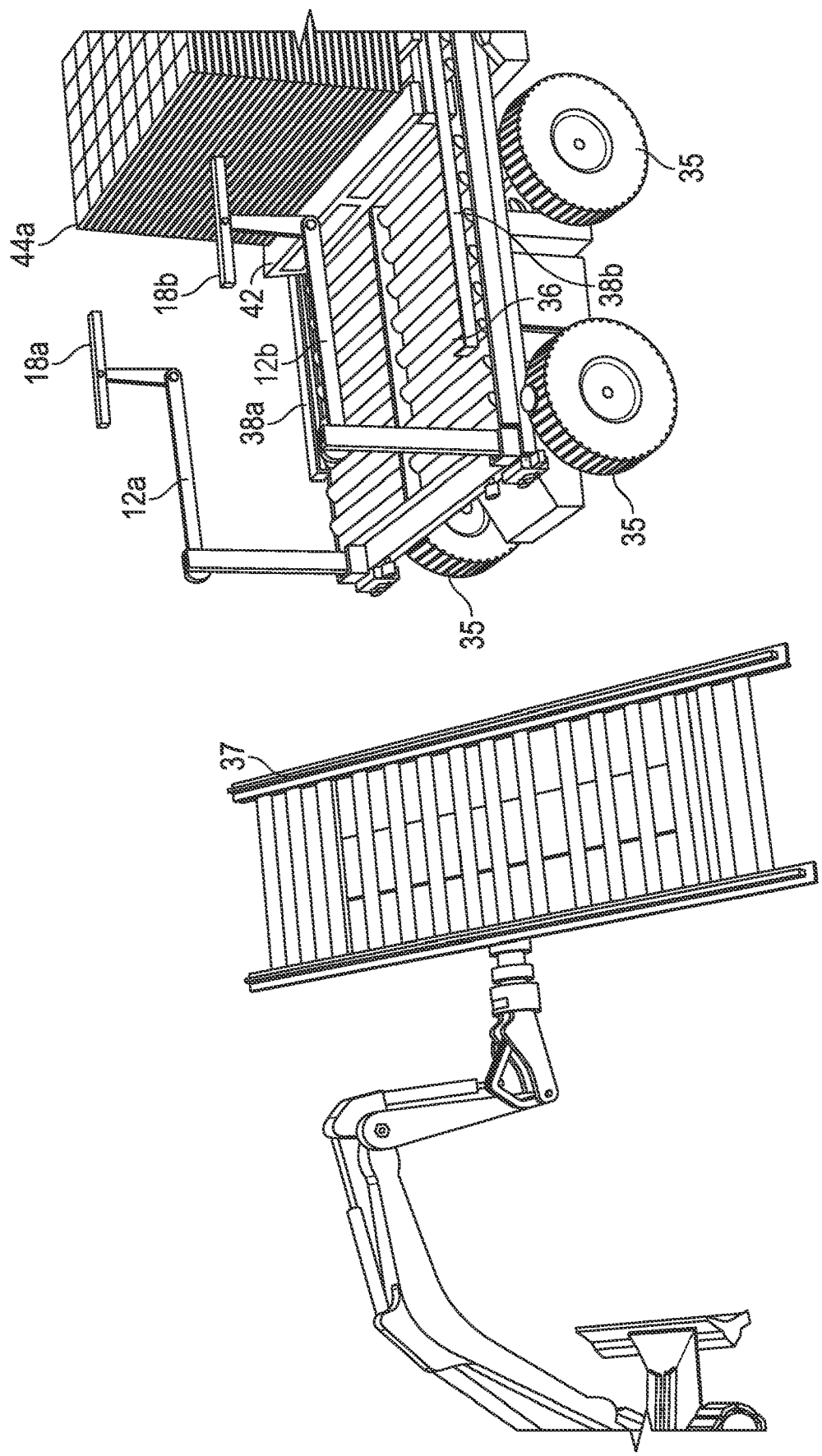
FIG. 12 is a perspective view of an exemplary embodiment of a photovoltaic module installation and delivery method showing a feeder assembly and a mobile unit with a machine-mounted tilted conveyor delivery surface in accordance with the present disclosure.

In exemplary embodiments, the delivery surface is a tilted machine-mounted conveyor 37, illustrated in FIG. 12. The rotatable arm 12 that aligns with the lower portion of the tilted machine-mounted conveyor 37 may rotate further and use more articulation points 14 to deliver the PV module 44 into place. The gripping pieces 24a, 24c and 24b, 24d then release the PV module 44a so it is deposited onto the machine-mounted conveyor 37. Throughout the process, the gripping pieces 24a, 24b stay in sync, i.e., parallel to each other.

In exemplary embodiments, the rotatable arms 12a and 12b activate once the PV modules 44 are in place and deliver the PV module 44a into place on the machine-mounted racking via tilted conveyor 37. Having delivered the first PV module 44a onto the tilted conveyor 37, the arms 12a, 12b rotate back into position so the grabber bars 18a, 18b and gripping pieces 24a, 24b are aligned with the next PV module 44b, which will be lower in the stack. The second PV module 44b is then gripped by gripping pieces 24a, 24b, and the arms 12a, 12b then rotate using their articulation points 14 and use more articulation points 14 to deliver the second PV module 44b onto the tilted conveyor 37. This process is repeated until all the PV modules 44 in the stack are delivered and the stack or pallet is empty. The empty pallet 42 may then be removed from the first mobile unit 20a and replaced with a new pallet with a full stack of PV modules 44 to be installed. It should be noted that the mobile unit may move so that it delivers modules into different adjacent columns or "slots" in the ground-mounted racking.

With reference to FIGS. 13 and 14, a second mobile unit 20b delivers the new pallet 42 to the first mobile unit 20a and transfers the new pallet to the first mobile unit. Substantial alignment between the mobile units is important. In particular, the second mobile unit feeding the new pallet has to align with the mobile unit conveyor 36 on the first mobile unit 20a so that it can deliver the modules 44. This second mobile unit aligns with the back end 32 of the first mobile unit 20a that has the feeder assembly 10 installed and delivers full pallets from the site staging area to keep the PV module feed process running continuously. As discussed above, the first mobile unit 20a has guide rails 38a, 38b on its upper surface 34 so that a new pallet 42 of PV modules 44 is guided into a consistent position to work with the rotatable arms 12a, 12b. In exemplary embodiments, the movement of the pallet 42 of PV modules 44 is achieved by a roller conveyor 36 mounted on the top of the mobile unit. This same conveyor assembly 36 is mounted on the second mobile unit (without the feeder assembly), so that it can automatically feed the full pallet 42 onto the first mobile unit 20a that has the feeder assembly 10.

Figure 15:
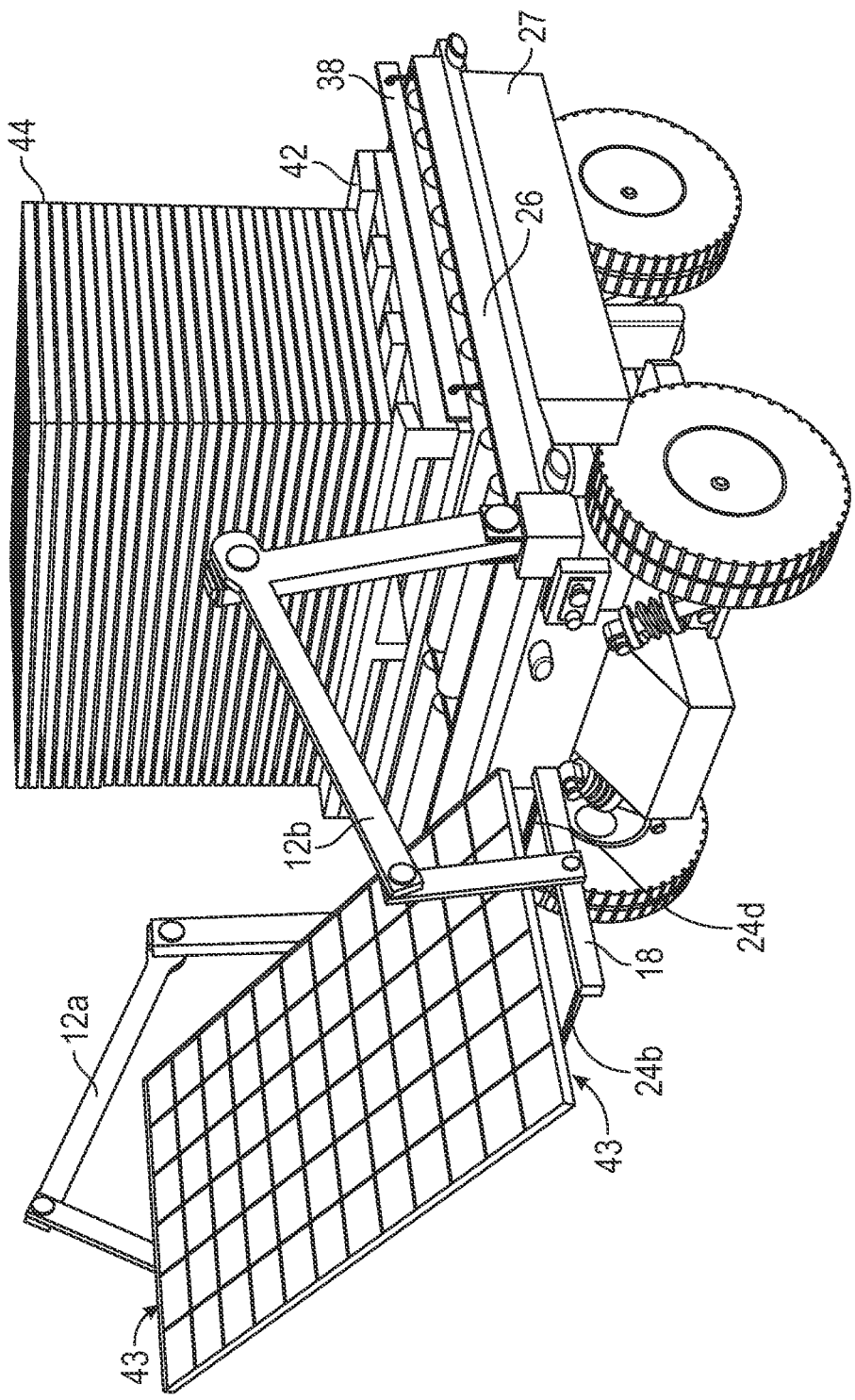
FIG. 15 is a perspective view of an exemplary embodiment of a photovoltaic module installation and delivery method showing a photovoltaic module feeder assembly and a mobile unit with a pallet of photovoltaic modules.

It should be noted that during exemplary installation operations, the feeder assembly 10 maintains at least the short side 43 of each PV module 44 parallel to the surface below it. As best seen in FIG. 11, the rotatable arms 12a, 12b, aided by articular points 14, keep at least the short side 43 of the first and subsequent photovoltaic modules 44 in a horizontal position relative to ground when moving each module over the ground. For at least some period of time as it is moved by the feeder assembly 10, the solar module 44 itself is maintained in a position horizontal or parallel to the ground. Furthermore, as illustrated in FIG. 15, the rotatable arms 12a, 12b ensure that the first and subsequent photovoltaic modules 44 are in a position parallel to the delivery surface, i.e., in a tilted position corresponding to the tilted surface of the machine-mounted conveyor 37, when the modules are released.

As it is being transferred from the pallet 42 to the machine-mounted conveyor 37, the PV module 44 is kept horizontal relative to the ground as the arms 12a, 12b rotate until the module gets close to the tilted conveyor 37, and then the arms 12a, 12b vary their respective positions to match the tilt angle of the conveyor 37. In exemplary embodiments, the short sides 43 of the PV module 44 remain parallel to the ground even when the module itself tilts to match the angle of the machine-mounted conveyor 37. It should be noted that the machine-mounted conveyor 37 need not be tilted; it could be straight. Alternatively, the process would also work in the case where the PV modules are packaged vertically and the modules rotated to maintain the short sides 43 parallel to the ground and the delivery surface.

Figure 17:
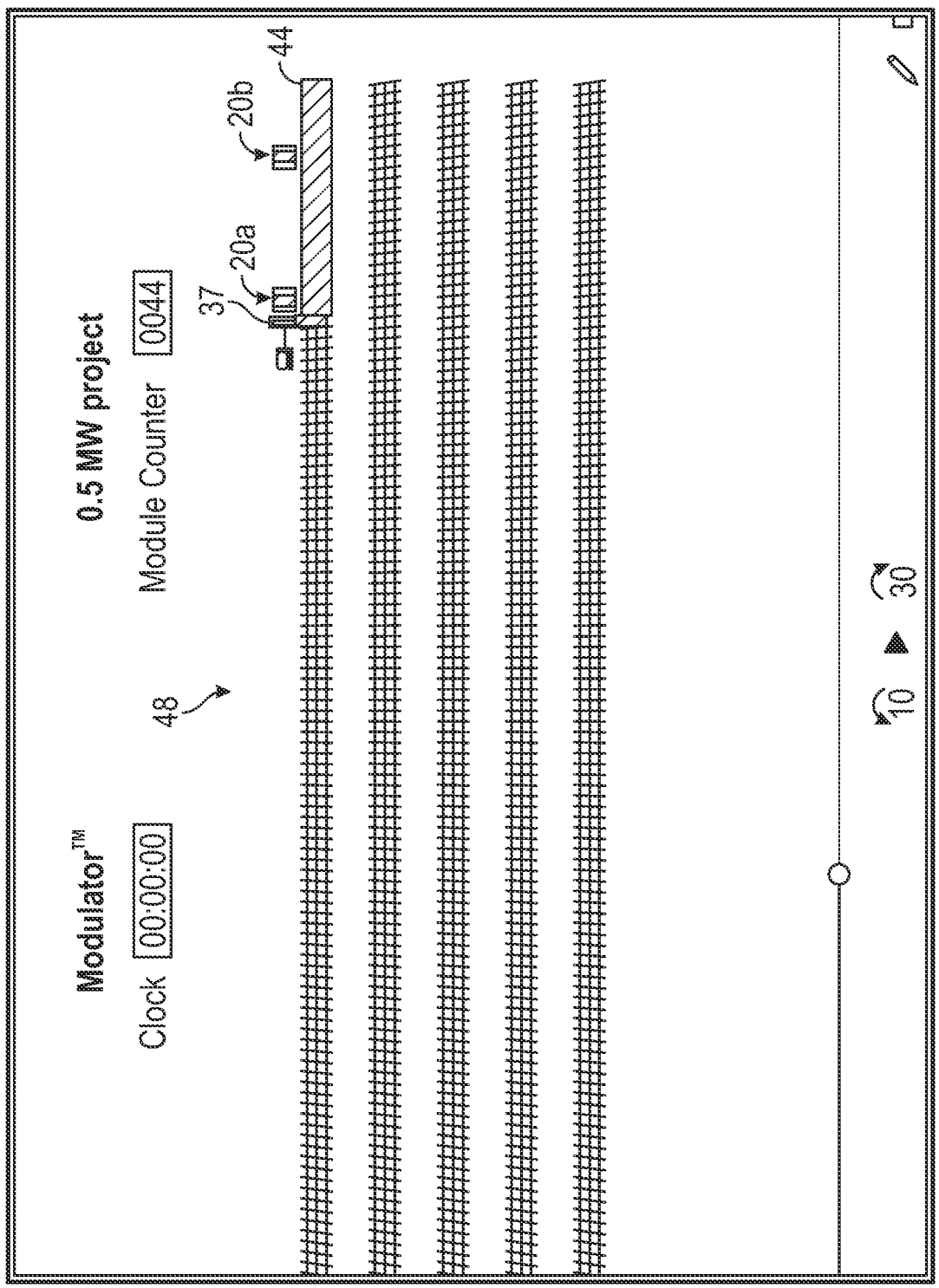
FIG. 17 is a top view of an exemplary embodiment of a sample PV plant installation in process in accordance with the present disclosure.

In exemplary embodiments, PV module feeder assemblies, mobile units, and installation processes are controlled by novel computer-implemented software. As illustrated in FIGS. 16 and 17, original software 46 enables design of the layout of a solar plant 48, including spacing of rows, tilt angle of modules, etc. The figures show a plan view of a sample PV plant 48, the delivery locations of the pallets 42 of modules 44 and the cross-section of the array to avoid shading. Advantageously, by using a plurality of inputs, the software determines and facilitates a just-in-time installation schedule. More particularly, it provides the capability to schedule 1) the timing of and 2) the position of the delivery of each pallet of solar modules that is used to construct the large-scale ground-mount photovoltaic power plant and enables continuous installation of solar modules as described above.

Thus, the software enables the feeder assembly 10 and mobile unit 20 to install the solar modules into the racking continuously as described in detail above. It makes the module pallet delivery process "Just-in-Time" rather than the current convention of staging pallets across the job site for later access by workers engaged in a manual installation process. Instead of large numbers of pallets being staged across a jobsite and workers traversing back-and-forth between those pallets and the current installation location on the racking, each pallet of modules is delivered to the automated installation machine when and as needed.

The software takes inputs including, but not limited to, number of modules per pallet, size of module, module configuration on the racking (number of modules in portrait or landscape orientation), length of rows, number of rows and location of the pallet staging area, and from those parameters it determines a delivery schedule and the timeline of movements for the automated carts that deliver the pallets to the installation machine described in this application.

Thus, it is seen that photovoltaic module feeder assemblies, mobile units, and PV modules installation methods are provided. It should be understood that any of the foregoing configurations and specialized components may be interchangeably used with any of the systems of the preceding embodiments. Although illustrative embodiments of the present invention are described hereinabove, it will be evident to one skilled in the art that various changes and modifications may be made therein without departing from the invention. It is intended in the appended claims to cover all such changes and modifications that fall within the true spirit and scope of the invention.

What is claimed is:

1. A photovoltaic module feeder system, comprising:
    a photovoltaic module feeder assembly comprising:
        two rotatable arms, each arm having a proximal and a distal end and a plurality of articulation points;
        a grabber bar coupled to the distal end of each rotatable arm; and
        at least two gripping pieces connected to each grabber bar; and
    a mobile unit having a left side, a right side, an upper surface, a front end, a back end, a conveyor mounted on the upper surface, and a pair of guide rails on the upper surface including a first guide rail located on the left side and a second guide rail located on the right side, each of the first guide rail and the second guide rail having a bent end positioned near the front end of the mobile unit, the bent ends forming stop rails;
    wherein the photovoltaic module feeder assembly is coupled to the front end of the mobile unit.

2. The photovoltaic module feeder system of claim 1 wherein when the rotatable arms move the photovoltaic module over the ground, the rotatable arms maintain short sides of the photovoltaic module in a horizontal position relative to the ground.

3. The photovoltaic module feeder system of claim 2 wherein the rotatable arms maintain the short sides of the photovoltaic module in a horizontal position by utilizing one or more of the plurality of articulation points.

4. The photovoltaic module feeder system of claim 1 wherein the mobile unit further comprises a pair of guide rails on the upper surface including a first guide rail located on the left side and a second guide rail located on the right side, and a stop rail positioned near the front end.

5. A method of installing photovoltaic modules, comprising:
    loading a first pallet of photovoltaic modules onto a first mobile unit having a photovoltaic module feeder assembly coupled to the mobile unit;
    rotating a pair of arms to position grabber bars and gripping pieces in alignment with a first photovoltaic module at the top of the pallet;
    gripping or supporting the first photovoltaic module;
    rotating the pair of arms toward a delivery surface and releasing the first photovoltaic module onto the delivery surface;
    rotating the pair of arms to position the grabber bars and gripping pieces in alignment with a subsequent photovoltaic module on the pallet;
    gripping or supporting the subsequent photovoltaic module; and
    rotating the pair of arms toward the delivery surface and releasing the subsequent photovoltaic module onto the delivery surface.

6. The method of claim 5 wherein when the rotatable arms move the first and subsequent photovoltaic module over the ground, the rotatable arms maintain short sides of the first and subsequent photovoltaic module in a horizontal position relative to the ground; and
    wherein when the rotatable arms move the first and subsequent photovoltaic module over the delivery surface, the rotatable arms maintain the first and subsequent photovoltaic module in a position parallel to the delivery surface.

7. The method of claim 5 further comprising repeating the rotating, gripping, and releasing steps until all the photovoltaic modules on the first pallet have been released onto the delivery surface and the first pallet is empty.

8. The method of claim 5 further comprising removing the empty pallet from the first mobile unit.

9. The method of claim 8 further comprising loading a second pallet of photovoltaic modules onto a second mobile unit and transferring the second pallet of photovoltaic modules onto the first mobile unit.

10. The method of claim 5 further comprising maintaining short sides of each photovoltaic module in a horizontal position relative to the ground during the rotating, gripping, and releasing steps.

11. The method of claim 5 wherein the delivery surface is a machine-mounted conveyor.

12. The method of claim 5 wherein the first mobile unit comprises a conveyor and a pair of guide rails on an upper surface.

13. The method of claim 5 wherein the method is controlled by computer-implemented software.

14. The method of claim 13 wherein the computer-implemented software utilizes a plurality of inputs to determine a just-in-time module installation and pallet delivery schedule.

* * * * *